(12) United States Patent
Natili et al.

(10) Patent No.: US 7,187,529 B2
(45) Date of Patent: Mar. 6, 2007

(54) APPARATUS AND METHOD FOR DETECTING A GAS ASSOCIATED WITH A GLOWING CONTACT AND INTERRUPTING A POWER CIRCUIT

(75) Inventors: Thomas E. Natili, Butler, PA (US); David M. Tallman, Marshall Township, PA (US)

(73) Assignee: Eaton Corporation, Cleveland, OH (US)

( * ) Notice: Subject to any disclaimer, the term of this patent is extended or adjusted under 35 U.S.C. 154(b) by 688 days.

(21) Appl. No.: 10/427,020

(22) Filed: Apr. 30, 2003

(65) Prior Publication Data

US 2004/0218330 A1 Nov. 4, 2004

(51) Int. Cl.
*H02H 5/00* (2006.01)
(52) U.S. Cl. ..................... 361/103; 361/115
(58) Field of Classification Search ............... 361/103, 361/115
See application file for complete search history.

(56) References Cited

U.S. PATENT DOCUMENTS

| | | | | |
|---|---|---|---|---|
| 3,237,179 | A | * | 2/1966 | Lindberg, Jr. ............. 340/515 |
| 3,721,880 | A | * | 3/1973 | Neill ........................ 318/471 |
| 4,360,801 | A | * | 11/1982 | Duhame ................... 340/521 |
| 4,767,913 | A | * | 8/1988 | Weber et al. .......... 219/130.21 |
| 5,394,094 | A | | 2/1995 | Wagner |
| 6,783,054 | B1 | * | 8/2004 | Pregeant et al. .......... 228/102 |

OTHER PUBLICATIONS

Sletbak, J. et al., "Glowing Contact Areas in Loose Copper Wire Connections", IEEE, 1991, pp. 244-248.
Hagimoto, Yasuaki, "Japanese Reports on Electrical Fire Causes", http://members.ozemail.com.au/-tcforen/japan/index.html, 1996, 12 pp.
Industrial Scientific Corporation, "ATX612 Multi-Gas Aspirated Monitor", http://www.indsci.com/atx612.html, Dec. 2001, 1 p.
Industrial Scientific Corporation, "ATX620 Multi-Gas Aspirated Monitor", http://www.indsci.com/atx620.html, Dec. 2001, 1 p.
Industrial Scientific Corporation, "LTX312 Multi-Gas Monitor", http://www.indsci.com/ltx312.html, Dec. 2001, 1 p.
Industrial Scientific Corporation, "Portable Instruments", http://www.indsci.com/port_inst.html, Dec. 2001, 1 p.
Industrial Scientific Corporation, "Portable Instruments", http://www.indsci.com/port_inst.html, Dec. 2001, 1 p.

(Continued)

*Primary Examiner*—Stephen W. Jackson
(74) *Attorney, Agent, or Firm*—Martin J. Moran

(57) ABSTRACT

A receptacle interrupts a power circuit including a glowing contact and a gas, such as hydrogen chloride, carbon dioxide, carbon monoxide or a combination of those gases, associated with the glowing contact. The receptacle includes a set of separable contacts for interrupting the power circuit, an operating mechanism controlling the set of separable contacts, and a trip mechanism, such as a trip coil, cooperating with the operating mechanism to open the set of separable contacts in response to a trip signal. A gas detector detects the gas and outputs a gas concentration signal based upon a level of the gas. A microprocessor outputs the trip signal responsive to the gas concentration signal whenever a predetermined concentration level of the gas is detected.

24 Claims, 4 Drawing Sheets

OTHER PUBLICATIONS

Industrial Scientific Corporation, "Portable Instrument Accessories", http://www.indsci.com/acc_remote.html, Dec. 2001, 4 pp.

Microsens SA, "Microsens Semiconductor Gas Sensor", 4 pp.

ION Optics, "Mems Optical (Infrared) Gas Sensor", http://www.ion-optics.com/mems.asp, Apr. 2003, 2 pp.

The Vinyl Environmental Resource Center (VERCE), "Vinyl Institute—Press Materials—Vinyl Institute", http://www.vinylinfo.org/publicationscenter/publications.html, Apr. 2003, 2 pp.

Drager, "Electrochemical sensors", http://www.draeger.com/com/ST/Prod/Detection/SMg/Sensors/sensors.jsp, Apr. 2003, 5 pp.

Gas Measurement Instruments Ltd., "Portable Instruments", http://www.gmiuk.com/html/portable/port-main.htm, Dec. 2001, 3 pp.

Gas Measurement Instruments Ltd., "Personal Surveyor", http://www.gmiuk.com/html/portable/personal/main.htm, Dec. 2001, 1 p.

Gas Measurement Instruments Ltd., "FI2000", http://www.gmiuk.com/html/portable/fi2000/main.htm, Dec. 2001, 1 p.

Microsens SA, "Microsens Catalytic Gas Sensor", 4 pp.

Microsens SA, "Microsens Thermal Conductivity Sensor", 4 pp.

The Vinyl Environmental Resource Center (VERCE), "Fire and Polyvinyl Chloride", http://www.vinylinfo.org/publicationscenter/publications, pp. 1-18.

* cited by examiner

APPARATUS AND METHOD FOR DETECTING A GAS ASSOCIATED WITH A GLOWING CONTACT AND INTERRUPTING A POWER CIRCUIT

BACKGROUND OF THE INVENTION

1. Field of the Invention

The present invention relates to electrical switching apparatus and, more particularly, to apparatus, such as circuit breakers and receptacles, for interrupting a power circuit and, more particularly, to such apparatus for interrupting a power circuit including a glowing contact. The invention also relates to a method for interrupting a power circuit including a glowing contact.

2. Background Information

A glowing contact is a high resistance electrical connection, which can form at the interface of a copper wire and an electrical connection device, such as, for example, a screw terminal of a receptacle. The resulting temperature rise at this connection point can melt the wire's insulation and damage the receptacle. It is desirable to be able to detect this condition and interrupt the current before the glowing contact fault progresses to a hazardous condition.

It is very easy to create a high resistance or glowing contact at a receptacle terminal using copper wire. See, for example, Sletbak, J., et al., "*Glowing Contact Areas in Loose Copper Wire Connections*," IEEE, 1991, pp. 244–48.

The hazards associated with glowing contacts, including contacts made with all combinations of copper, brass and iron are known. See Yasuaki Hagimoto, "*Japanese Reports on Electrical Fire Causes,*" http://members.ozemail. com.au/~tcforen/japan/index.html, 1996, 12 pp.

Various standards organizations (e.g., NFPA, CPSC, NIST and NRIPS (Japan)) have shown through extensive studies that a glowing contact is a fire hazard. For example, NRIPS conducted a study showing that at the center of the glowing contact, the temperature exceeds 1250° C., which is above the melting temperature of copper and the flash over temperature of many materials.

Glowing contacts may result from loose connections (e.g., improper splicing with twist-on wire connectors, wires twisted together and wrapped with electrical tape, insufficient tightening of terminals). This type of hazard can happen with as little current as about 0.3 A. When a glowing contact is formed, the current during that formation and the subsequent current flowing through the glowing contact is typically normal, since the voltage drop across a glowing contact is typically about 2 VAC. This typically does not affect most downstream electrical appliances. The existence of a glowing contact, therefore, is not reliably detectable by a conventional upstream current protective device (e.g., a conventional circuit breaker or fuse).

In a CPSC sponsored study of 105 electrical fires in ten different cities, the three dominant conclusions for equipment involved in the ignition included: (1) fixed wiring (37%); (2) cords and plugs (26%); and (3) switches, receptacles and outlets (17%). The most prevalent places for these events to occur are in concealed spaces within ceiling, walls and attics (42%). The main area of origin was the bedroom (17.1%). Of all the equipment involved versus the form of heat of ignition, the largest percentage of heat of ignition was due to loose and faulty connections (26%).

Since the advent of arc fault circuit interrupter (AFCI) technology, the possibility of these occurrences has been greatly reduced. The NFPA has shown that from 1994 to 1998, a total of 73,500 fires had occurred, of which 60,900 fires were caused by electrical arcing. The CPSC has concluded from this data that employing AFCI technology could have prevented about 50% to 75% of those fires.

A significant culprit associated with a glowing contact is copper oxide ($Cu_2O$). There are two recognized mechanisms for creating a high resistance copper oxide contact: arcing; and fretting. The arcing mechanism involves, for example, a loose receptacle screw terminal and slight movement of the wire while it is carrying a current. Every time the electrical connection is broken, a single electrical arc discharge can occur.

Each single arc discharge forms a small amount of copper oxide at the terminal-to-copper wire interface. With repeated discharges, the amount of the copper oxide increases over time. Copper oxide has a number of characteristics which, when combined, creates a hazard. First, the interface can be mechanically strong. Hence, once the terminal-to-copper wire connection is made through the copper oxide, the connection may become permanent. Second, copper oxide is a semiconductor that has a very high negative resistance-versus-temperature characteristic between about 180° C. and about 250° C. Over this temperature range, the resistance decreases as much as five orders of magnitude. As the connection heats, the current tends to concentrate into a relatively narrow region, thereby resulting in a very high current density and temperature. For example, a temperature of about 1200° C. to about 1300° C. may result, which temperature is hot enough to melt, for example, a receptacle's plastic housing, but not the copper oxide. Then, as the terminal heats, the wire insulation begins to fail.

During a glowing contact fault in a receptacle, the copper wire reaches a glowing temperature value at which time the wire looks like an electric heater coil. First, the wire's insulation melts at the terminal and, then, slowly progresses away from the terminal toward other wires in the receptacle's outlet box. This can result in either an arcing fault or a ground fault if the bare glowing wire contacts another conductor. Second, the heat resulting from the glowing contact fault flows into the receptacle and causes the plastic housing of the receptacle to melt. As the plastic melts, the receptacle loses its mechanical integrity and, thus, the electrical isolation between conductors is compromised. This may ultimately lead to either a line-to-ground fault or a neutral-to-ground fault. In the event that the upstream protective device (e.g., a circuit breaker) does not respond, then the plastic could ignite.

AFCIs, ground fault circuit interrupters (GFCIs) and conventional thermal-magnetic circuit breakers all have overcurrent protection in which the magnetic and thermal tripping characteristics meet strict standards. Unfortunately, a glowing contact is a localized condition and the resulting generated heat is not detectable by conventional devices. Hence, significant damage may result to both wire insulation and the receptacle.

U.S. patent application Ser. No. 10/192,580, filed Jul. 10, 2002, discloses a receptacle including a line circuit having a first temperature, a neutral circuit having a second temperature, and a load terminal. Separable contacts are adapted to electrically connect the line circuit and the load terminal. An operating mechanism opens the separable contacts in response to a trip signal. A first diode temperature sensor outputs a first signal representative of the first temperature of the line circuit, and a second diode temperature sensor outputs a second signal representative of the second temperature of the neutral circuit. A difference circuit determines the difference between the first and second signals, and a trip circuit provides the trip signal as a function of the difference.

It is known to employ gas detection technology in industry to detect, for example, natural gas leaks in the home, hazardous chemical leaks, and air quality.

Conventional AFCI devices are intelligent devices, which detect most arcing faults. However, such devices do not detect glowing contact faults until after the occurrence of arcing, or the occurrence of shorting to either ground or neutral. If an AFCI device providing, for example, about 30 ma GFCI protection is employed (e.g., an upstream circuit breaker with both arc and ground fault protection), then that device responds to arcing and/or to a ground fault resulting from insulation damage caused by the glowing contact. Hence, the AFCI/GFCI device will eventually trip, in order to de-energize the branch circuit, thereby protecting the wiring and/or receptacle, which was damaged by the glowing contact. Nevertheless, significant damage may still occur due to overheating in the vicinity of the glowing contact.

There exists the need to provide improved protection from glowing contacts for electrical switching devices, such as receptacles and circuit breakers.

SUMMARY OF THE INVENTION

These needs and others are met by the present invention, which detects a gas associated with a glowing contact in a power circuit, outputs a signal when a predetermined level of the gas is detected, and opens a set of separable contacts in response to that signal, in order to interrupt the power circuit.

In accordance with one aspect of the invention, an apparatus for interrupting a power circuit including a glowing contact and a gas associated with the glowing contact comprises: a set of separable contacts for interrupting the power circuit; a mechanism for opening the set of separable contacts in response to a first signal; means for detecting the gas and outputting a second signal based upon a level of the gas; and a circuit outputting the first signal responsive to the second signal when a predetermined level of the gas is detected.

The gas may be associated with overheating of an insulator for the power circuit, or may be associated with a fire associated with overheating of the power circuit. The gas may be hydrogen chloride or carbon dioxide.

As another aspect of the invention, an apparatus for interrupting a power circuit including a glowing contact and a gas associated with the glowing contact comprises: an electrical switching device comprising: a set of separable contacts for interrupting the power circuit, and a mechanism for opening the set of separable contacts in response to a first signal; means for detecting the gas and outputting a second signal based upon a level of the gas; and a circuit outputting the first signal responsive to the second signal when a predetermined level of the gas is detected.

The means for detecting and the circuit outputting the first signal may be internal to or external to the electrical switching device.

The electrical switching device may be a ground fault circuit breaker, and the first signal may be a predetermined ground current in the power circuit.

The mechanism for opening the set of separable contacts in response to a first signal may include a shunt trip mechanism for a circuit breaker, and the first signal may be a shunt trip signal.

The circuit outputting the first signal responsive to the second signal may comprise a silicon controlled rectifier and a microprocessor receiving the second signal and outputting a third signal. The microprocessor may determine when the second signal exceeds the predetermined level of the gas and responsively output the third signal. The silicon controlled rectifier may respond to the third signal and output the first signal to the power circuit. The set of separable contacts and the mechanism for opening the set of separable contacts may be part of a ground fault circuit breaker in the power circuit, and the first signal may be a predetermined ground current in the power circuit.

The electrical switching device may be a receptacle, and the circuit outputting the first signal may communicate the first signal to the receptacle from inside the receptacle.

As another aspect of the invention, a method for interrupting a power circuit including a glowing contact and a gas associated with the glowing contact comprises: employing a set of separable contacts for interrupting the power circuit; opening the set of separable contacts in response to a signal; determining when a level of the gas exceeds a predetermined level; and outputting the signal responsive to such determining when a level of the gas exceeds a predetermined level.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
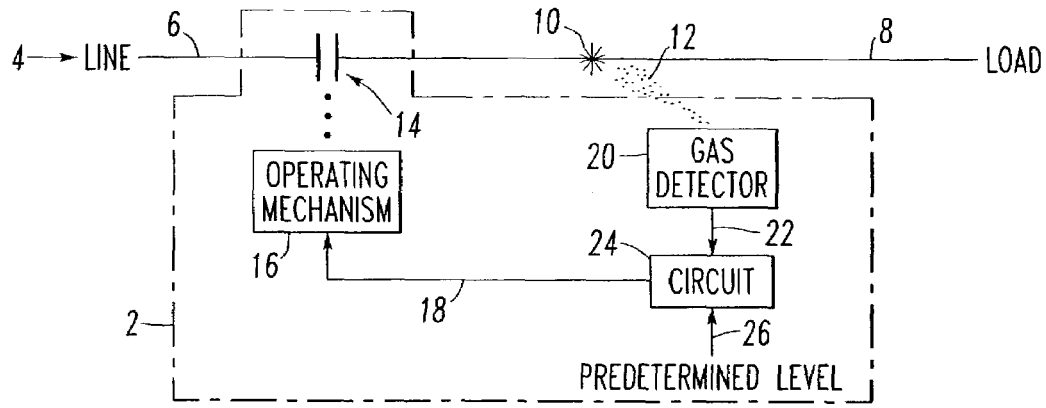
FIG. 1 is a block diagram of an apparatus for interrupting a power circuit including a glowing contact in accordance with the present invention.

Referring to FIG. 1, an apparatus 2 for interrupting a power circuit 4 is shown. The power circuit 4 includes a line portion 6 (e.g., electrically connected to a suitable power source (not shown)), a load portion 8 (e.g., electrically connected to a suitable load (not shown)), and a glowing contact 10 therebetween. A gas 12 is associated with the glowing contact 10. The apparatus 2 includes a set 14 of separable contacts for interrupting the power circuit 4. A mechanism, such as an operating mechanism 16, opens the set 14 of separable contacts in response to a first or trip signal 18. The operating mechanism 16 may incorporate or cooperate with one or more trip mechanisms (not shown). In accordance with the present invention, the apparatus 2 further includes a mechanism, such as a gas detection sensor 20, for detecting the gas 12 and outputting a second or gas concentration signal 22 based upon a concentration level of the gas 12. A suitable circuit 24 receives the second signal 22 and outputs the first signal 18 responsive thereto when a predetermined level 26 of the gas 12 is detected.

The apparatus 2 advantageously interrupts the power circuit 4, thereby extinguishing the glowing contact 10, by opening the set 14 of separable contacts to interrupt such power circuit in response to the trip signal 18. This decision is determined by the circuit 24 when the level of the gas 12, as evolved from the glowing contact 10, exceeds the predetermined level 26. In response to that decision, the circuit 24 outputs the trip signal 18.

For example, a glowing contact condition, such as 10, initially may cause breakdown of wiring insulation (not shown) and/or a fire (not shown) due to overheating of the power circuit 4. It is desirable to detect this condition prior to the occurrence of an arcing condition or a ground fault condition in the power circuit 4, and trip the set 14 of separable contacts (e.g., without limitation, of a circuit breaker or a receptacle) at a relatively earlier opportunity. The detection of wire insulation degradation or a fire is provided by the detection of one or more gases, such as 12, which are evolved from the glowing contact 10. In accordance with the invention, a predetermined level, such as 26, of a particular gas, such as 12, is detected. When this level or a higher level is found, the trip signal 18 is suitably relayed to open the set 14 of separable contacts.

Figure 2:
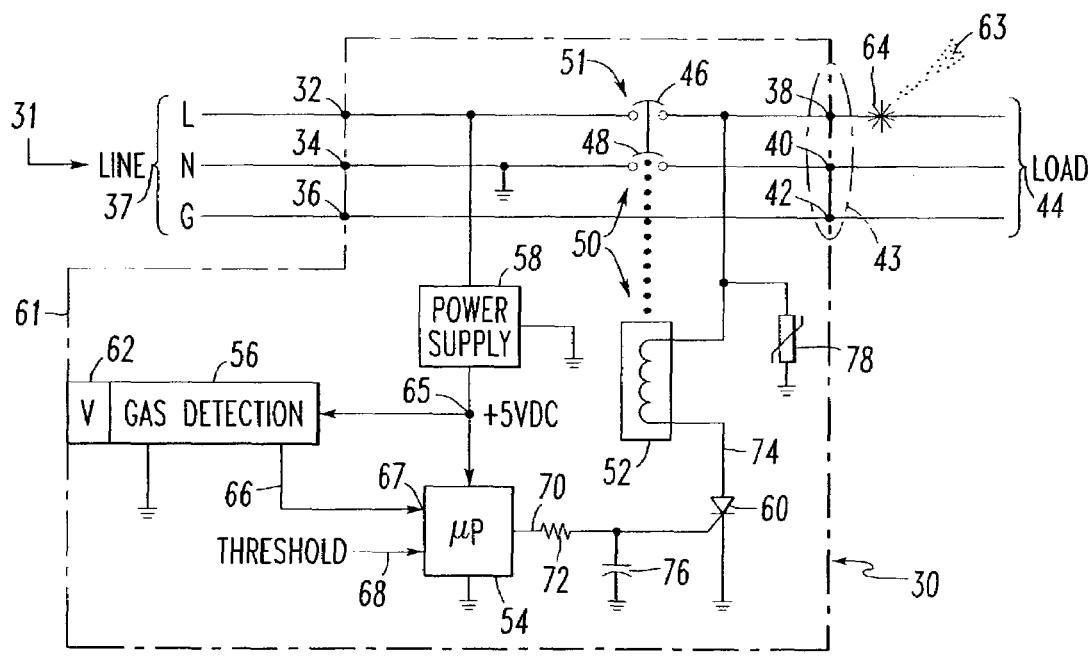
FIG. 2 is a block diagram of a receptacle in accordance with an embodiment of the present invention.

FIG. 2 shows a receptacle 30 for a power circuit 31 in accordance with an embodiment of the invention. Although the present invention is disclosed in connection with AFCI and/or GFCI circuit breakers and receptacles, the invention is applicable to a wide range of electrical switching apparatus. The receptacle 30 includes terminals 32, 34 and 36 for line (L), neutral (N) and ground (G) connections, respectively, of a line portion 37 of the power circuit 31. The receptacle 30 further includes female load, load neutral and ground terminals 38, 40 and 42, respectively, for each one or more three-conductor outlets, such as single outlet 43, for a load portion 44 of the power circuit 31. The receptacle 30 also includes one or more sets 46,48 of separable contacts and a mechanism 50 for opening such contacts. The mechanism 50 includes an operating mechanism 51 controlling the sets 46,48 of separable contacts and a trip mechanism, such as trip coil 52, cooperating with the operating mechanism 51 and responding to a trip signal 74, as discussed below.

The receptacle 30 further includes a microprocessor (µP) 54, a gas detection sensor 56, a power supply 58, a switch, such as SCR 60, and a housing 61. The housing 61 includes a vent (V) 62, which permits the gas detection sensor 56 to detect one or more gases, such as 63, which are evolved from a glowing contact, such as 64, in the power circuit 31. The gas 63 passes through the housing vent 62 to the gas detection sensor 56. The power supply (e.g., AC/DC) 58 is powered from the line and neutral terminals 32,34 and provides a suitable power source (e.g., +5 VDC) 65 to the µP 54 and gas detection sensor 56. The sensor 56, in turn, outputs a gas concentration signal 66 based upon the concentration level of the gas 63.

The µP 54 receives the gas concentration signal 66 and determines when such signal exceeds a predetermined threshold level 68 of such gas. When that condition is determined (e.g., by converting an analog gas concentration signal, such as 66, to a digital value using an external (not shown) or an internal A/D converter 67 and comparing that digital value to the predetermined threshold level 68 from external or internal µP RAM (not shown); by receiving a digital gas concentration value from a suitable gas detection sensor (not shown) and comparing that digital value to the predetermined threshold level 68; by employing a comparator (not shown) to compare an analog gas concentration value, such as 66, to an analog predetermined threshold level (not shown) and inputting a resulting digital comparison value (not shown) to the µP), the µP 54 outputs a signal 70 through a resistor 72 to the gate of the SCR 60. The SCR 60, in turn, responds to the signal 70 and outputs a trip signal 74 to the trip coil 52, by conducting a suitable trip current from the load terminal 38, and through the series combination of the trip coil 52 and the SCR 60, to the neutral terminal 34. In this embodiment, the µP 54 and the gas detection sensor 56 are internal to the receptacle 30 and communicate the trip signal 74 from inside such receptacle.

Preferably, the receptacle 30 includes a gate capacitor 76, which filters noise from the SCR gate, and an MOV 78, which protects the trip coil 52 and associated circuitry.

Figure 3:
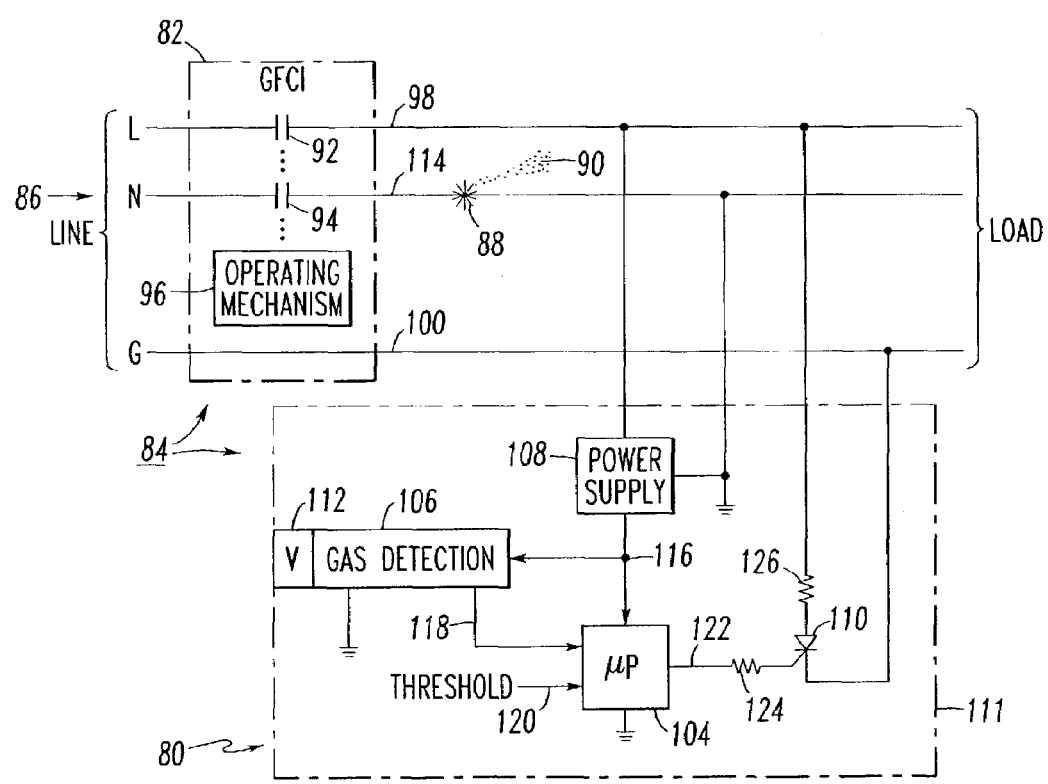
FIG. 3 is a block diagram of a gas detection module and an upstream ground fault circuit breaker in accordance with another embodiment of the invention.

FIG. 3 shows a gas detection module 80 and an upstream ground fault circuit breaker (GFCI) 82. The module 80 and GFCI 82 form an apparatus 84 for interrupting a power circuit 86 including a glowing contact 88 and a gas 90 associated therewith. As is well-known, the GFCI 82 includes one or more sets 92,94 of separable contacts for interrupting the power circuit 86, and an operating mechanism 96 for opening such sets of separable contacts in response to a ground fault condition between the line (L) 98 and ground (G) 100 of the power circuit 86.

The gas detection module 80 includes a microprocessor (µP) 104, a gas detection sensor 106, a power supply 108, a switch, such as SCR 110, and a housing 111. The housing 111 includes a vent (V) 112, which permits the gas detection sensor 106 to detect one or more gases, such as 90, which are evolved from the glowing contact 88 in the power circuit 86. The gas 90 passes through the housing vent 112 to the gas detection sensor 106. The power supply 108 is powered from the line 98 and neutral 114 of the power circuit 86 and provides a suitable power source (e.g., +5 VDC) 116 to the µP 104 and gas detection sensor 106. The sensor 106, in turn, outputs a gas concentration signal 118 based upon the concentration level of the gas 90. The µP 104 receives the gas concentration signal 118 and determines when such signal exceeds a predetermined threshold level 120 of such gas. When that condition is determined (i.e., the predetermined threshold level 120 of the gas 90 is detected), the µP 104 outputs a signal 122 through a resistor 124 to the gate of the SCR 110. The SCR 110, in turn, responds to the signal 122 and outputs a suitable ground fault current through resistor 126 between the line 98 and ground 100 of the power circuit 86. The resistor 126 is selected such that the resulting ground fault current trips the GFCI 82 and, thus, the power circuit 86, thereby extinguishing the glowing contact 88. In this embodiment, the gas detection module 80, the µP 104 and the gas detection sensor 106 are external to the GFCI 82. This embodiment employs an upstream GFCI device, such as 82, which is capable of recognizing a ground fault condition in the power circuit 86.

Although the GFCI 82 is shown, any suitable electrical switching device may be employed, such as, for example, an AFCI device, another GFCI device, an AFCI/GFCI device, a circuit breaker or a receptacle. For example, if a personnel protection ground fault circuit interrupter is employed, then the level of the ground fault current through the resistor 126 is set to about 5 ma to about 6 ma. Otherwise, if an equipment protection ground fault circuit interrupter is employed, then the level of the ground fault current through the resistor 126 is set to about 30 ma to about 40 ma. Alternatively, if an AFCI device is employed, a suitable gas detection module may output a simulated arc fault waveform rather than a ground fault current. As other alternatives, any suitable mechanism (e.g., direct wiring, power line carrier) for communicating a trip signal from a gas detection module to an electrical switching device, such as a circuit breaker or receptacle, may be employed. In these embodiments, the gas detection module outputs and communicates the trip signal to the electrical switching device from outside such device.

Figure 4:
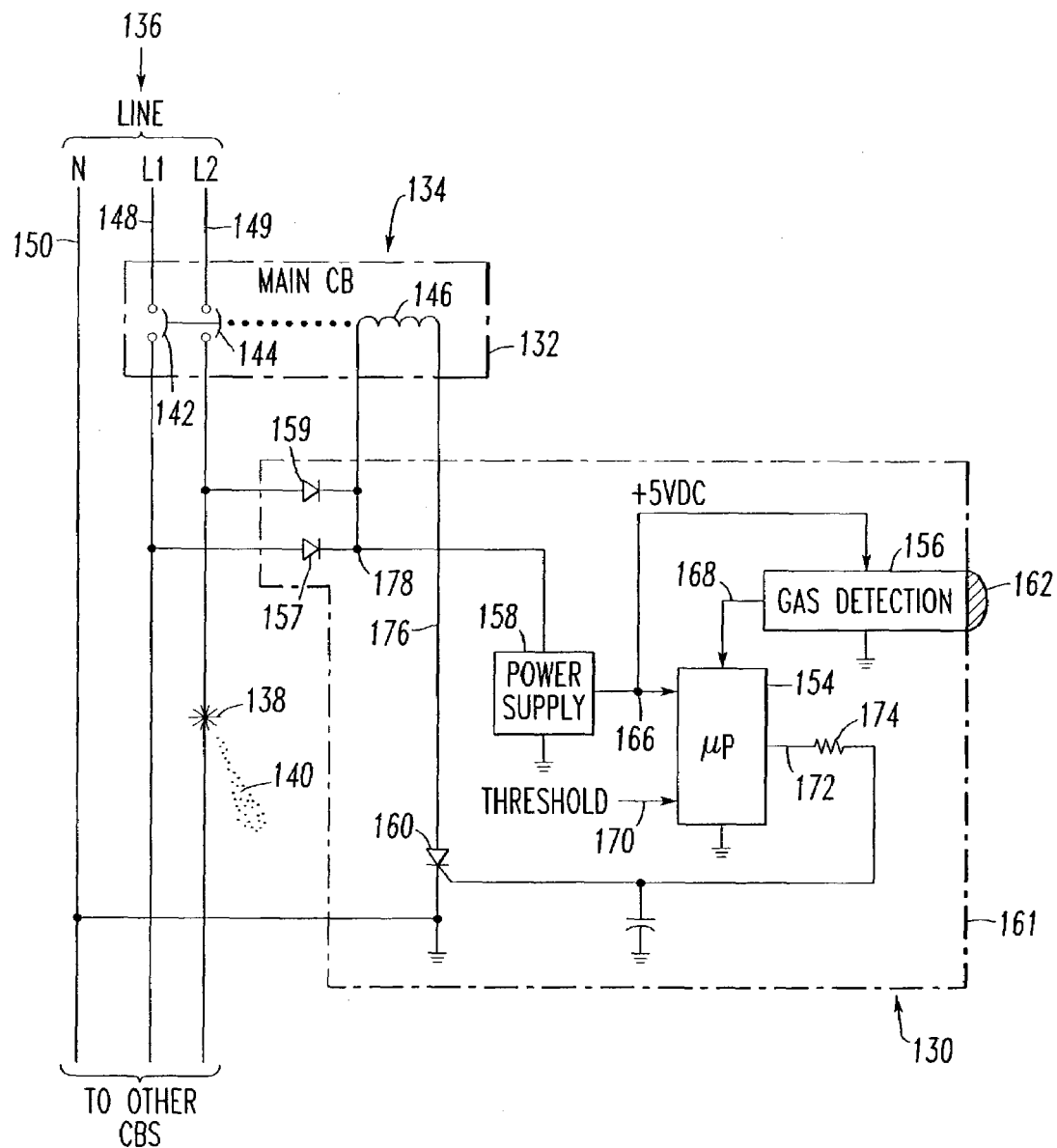
FIG. 4 is a block diagram of a gas detection module and a main circuit breaker of a load center in accordance with another embodiment of the invention.

FIG. 4 shows a gas detection module 130 and a main circuit breaker (MAIN CB) 132 of a load center 134 or panel board for one or more power circuits 136 including a glowing contact 138. The gas detection module 130 may be located with or inside the load center 134, in order to detect a predetermined threshold level 170 of a gas 140 evolving from the glowing contact 138, in order to shut down the entire load center 134 by shunt tripping the main circuit breaker 132.

As is well-known, the main circuit breaker 132 includes one or more sets 142,144 of separable contacts and a shunt trip coil 146 for interrupting the power circuit 136. The two sets 142 and 144 of separable contacts correspond to a first line (L1) 148 and a second line (L2) 149, respectively, of the power circuit 136, which also includes a neutral conductor 150.

The gas detection module 130 includes a microprocessor (µP) 154, a gas detection sensor 156, a power supply 158, a switch, such as SCR 160, and a housing 161. The housing 161 includes a vent 162, which permits the gas detection sensor 156 to detect one or more gases, such as 140, which are evolved from the glowing contact 138 in the power circuit 136. The gas 140 passes through the housing vent 162 to the gas detection sensor 156. The power supply 158 is powered through diodes 157,159 from the two power lines 148,149, respectively, of the power circuit 136 and provides a suitable power source (e.g., +5 VDC) 166 to the µP 154 and gas detection sensor 156. The sensor 156, in turn, outputs a gas concentration signal 168 based upon the concentration level of the gas 140. The µP 154 receives the gas concentration signal 168 and determines when such signal exceeds the predetermined threshold level 170 of such gas. When that condition is determined (i.e., the predetermined threshold level 170 of the gas 140 is detected), the µP 154 outputs a signal 172 through a resistor 174 to the gate of the SCR 160. The SCR 160, in turn, responds to the signal 172 and outputs a suitable signal 176 through the shunt trip coil 146 to the neutral 150. Power for the shunt trip coil 146 is advantageously provided from node 178, which also powers the power supply 158 from the cathodes of the diodes 157,159. When the shunt trip coil 146 is, thus, energized, the separable contacts 142,144 are opened, thereby extinguishing any downstream glowing contacts, such as 138. In this embodiment, the gas detection module 130, the µP 154 and the gas detection sensor 156 are external to the circuit breaker 132 and are preferably housed within the load center 134. Thus, if the threshold level 170 of the gas 140 is detected, the µP 154 employs the trip signal 172 through the resistor 174 and SCR 160 in order to energize the shunt trip coil 146 in the main circuit breaker 132, thereby shutting off the load center 134.

Figure 5:
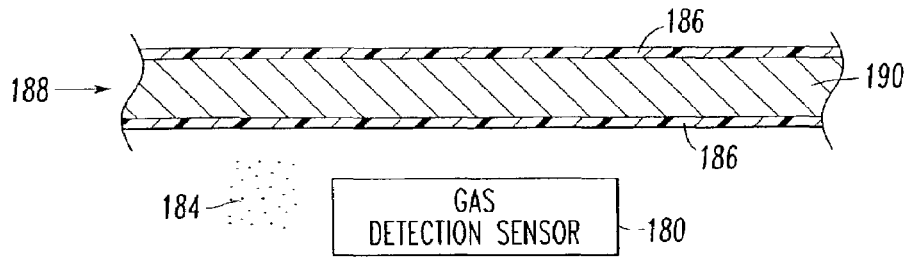
FIGS. 5 and 6 are block diagrams of two types of gas detection sensors in accordance with embodiments of the invention.
Figure 6:
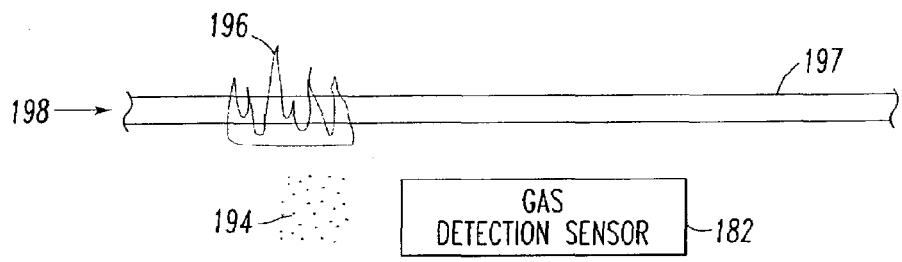
Figure 7:
FIGS. 7–11 are block diagrams of other types of gas detection sensors in accordance with other embodiments of the invention.
Figure 8:
Figure 9:
Figure 10:
Figure 11:
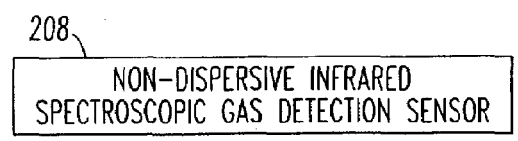

FIGS. 5 and 6 show two types of gas detection sensors 180 and 182, respectively, in accordance with embodiments of the invention. The sensor 180 of FIG. 5 senses hydrogen chloride 184 associated with overheating of an insulator 186 for a power circuit 188. In this example, the µP thresholds (e.g., 68 of FIG. 2, 120 of FIG. 3 or 170 of FIG. 4) would be about 1 ppm or less of hydrogen chloride in the atmosphere about such sensor 180. For example, this level is indicative of overheated PVC wiring (e.g., Romex®) 190 in the power circuit 188. Hydrogen chloride is one example of a gas that is given off by PVC wiring 190. The majority of combustion products given off by PVC are the same as those produced by wood or most other common materials, both natural and synthetic. The one product given off by PVC that is not given off by natural materials is hydrogen chloride (HC1). Detection of this type of gas can be accomplished with a wide range of gas detection sensors (e.g., a Microsens semiconductor gas sensor, such as a MSGS 3000 Monosensor), which may readily be calibrated to detect HC1.

The sensor 182 of FIG. 6 senses carbon dioxide 194 associated with a fire 196 arising from overheating of a conductor 197 of a power circuit 198. In this example, the µP thresholds (e.g., 68 of FIG. 2, 120 of FIG. 3 or 170 of FIG. 4) would be about 1 ppm to about 10 ppm of carbon dioxide in the atmosphere about such sensor. Detection of this type of gas can be accomplished with a wide range of gas detection sensors. The sensor 182 may be, for example, a MEMS NDIR sensor marketed by Ion Optics of Waltham, Mass., or any other suitable sensor (e.g., as marketed by Microsens SA of Neuchâtel, Switzerland; or Draeger Safety, Inc. of Pittsburgh, Pa.

As an alternative to the sensor 182, one or more other sensors may be employed to sense one or more gases, such as, for example, carbon dioxide ($CO_2$), carbon monoxide (CO) and/or hydrogen chloride (HC1). For example, such a combination of gases is HC1 (since that is one product given off by PVC that is not given off by natural materials) and CO (since all organic materials, when burned, release that gas). For example, the Microsens MSGS 4000 Multisensor semiconductor gas sensor may be calibrated for up to four or more gases.

FIGS. 7–11 show other types of gas detection sensors in accordance with other embodiments of the invention. Such gas detection sensors may be selected from the group comprising an electrochemical gas detection sensor 200 of FIG. 7, a catalytic gas detection sensor 202 of FIG. 8, a semiconductor gas detection sensor 204 of FIG. 9, an infrared gas detection sensor 206 of FIG. 10, and a nondispersive infrared spectroscopic gas detection sensor (NDIR) 208 of FIG. 11. All of these sensors may be employed to output a gas concentration signal, such as 201 of FIG. 7, for comparison with a predetermined detection or threshold level of a corresponding gas, such as hydrogen chloride or carbon dioxide. In turn, these sensors 200,202, 204,206,208 may be incorporated into or in combination with an electrical switching device, such as a receptacle or circuit breaker, or in or with the main circuit breaker of a load center or panel board. Such sensors are preferably calibrated to detect a suitable level of hydrogen chloride and/or carbon dioxide.

Although the receptacle 30, the gas detection module 80 and the gas detection module 130 are microprocessor-based, any suitable analog and/or digital and/or processor-based circuitry may be employed. For the microprocessor-based examples, the sensor signal(s) 66,118,168 may be periodically converted and/or sampled and/or may be read in response to a suitable interrupt signal.

Although the receptacle 30, the gas detection module 80 and the gas detection module 130 employ single gas detection sensors 56, 106 and 156, respectively, two or more gas detection sensors for the same or different gases may be employed to improve the reliability of the detection of glowing contacts. For example, this may involve detecting suitable levels of both carbon dioxide and hydrogen chloride before tripping the corresponding power circuits 31, 86 and 136, respectively.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An apparatus for interrupting a power circuit including a glowing contact and a gas associated with said glowing contact, said apparatus comprising:
   a set of separable contacts for interrupting said power circuit;
   a mechanism for opening said set of separable contacts in response to a first signal;
   means for detecting said gas and outputting a second signal based upon a level of said gas; and
   a circuit outputting said first signal responsive to said second signal when a predetermined level of said gas is detected.

2. The apparatus of claim 1 wherein said gas is a gas associated with overheating of an insulator for said power circuit.

3. The apparatus of claim 2 wherein said gas associated with overheating is hydrogen chloride.

4. The apparatus of claim 1 wherein said gas is a gas associated with a fire associated with overheating of said power circuit.

5. The apparatus of claim 4 wherein said gas associated with a fire is carbon dioxide.

6. The apparatus of claim 1 wherein said gas is hydrogen chloride; and wherein the predetermined level of said hydrogen chloride is about 1 ppm of said hydrogen chloride.

7. The apparatus of claim 1 wherein said gas is carbon dioxide; and wherein the predetermined level of said carbon dioxide is about 1 ppm to about 10 ppm of said carbon dioxide.

8. The apparatus of claim 1 wherein said means for detecting includes a gas detection sensor.

9. The apparatus of claim 8 wherein said gas detection sensor is selected from the group comprising an electrochemical gas detection sensor, a catalytic gas detection sensor, a semiconductor gas detection sensor, and a non-dispersive infrared spectroscopic gas detection sensor.

10. The apparatus of claim 1 wherein said circuit outputting said first signal responsive to said second signal comprises a switch and a microprocessor receiving said second signal and outputting a third signal, said microprocessor determining when said second signal exceeds said predetermined level of said gas and responsively outputting said third signal, said switch responding to said third signal and outputting said first signal.

11. An apparatus for interrupting a power circuit including a glowing contact and a gas associated with said glowing contact, said apparatus comprising:
   an electrical switching device comprising:
      a set of separable contacts for interrupting said power circuit, and
      a mechanism for opening said set of separable contacts in response to a first signal;
   means for detecting said gas and outputting a second signal based upon a level of said gas; and
   a circuit outputting said first signal responsive to said second signal when a predetermined level of said gas is detected.

12. The apparatus of claim 11 wherein said means for detecting and said circuit outputting said first signal are internal to said electrical switching device.

13. The apparatus of claim 11 wherein said means for detecting and said circuit outputting said first signal are external to said electrical switching device.

14. The apparatus of claim 11 wherein said electrical switching device is selected from the group comprising an AFCI device, a GFCI device, an AFCI/GFCI device, a circuit breaker, and a receptacle.

15. The apparatus of claim 11 wherein said electrical switching device is a personnel protection ground fault circuit interrupter.

16. The apparatus of claim 11 wherein said electrical switching device is an equipment protection ground fault circuit interrupter.

17. The apparatus of claim 11 wherein said electrical switching device is a circuit breaker within a load center or panel board.

18. The apparatus of claim 11 wherein said electrical switching device is a circuit breaker; and wherein said circuit outputting said first signal communicates said first signal to said circuit breaker from outside said circuit breaker.

19. The apparatus of claim 18 wherein said circuit breaker is a ground fault circuit breaker; and wherein said first signal is a predetermined ground current in said power circuit.

20. The apparatus of claim 18 wherein said mechanism for opening said set of separable contacts in response to a first signal includes a shunt trip mechanism for said circuit breaker; and wherein said first signal is a shunt trip signal.

21. The apparatus of claim 11 wherein said circuit outputting said first signal responsive to said second signal comprises a silicon controlled rectifier and a microprocessor receiving said second signal and outputting a third signal, said microprocessor determining when said second signal exceeds said predetermined level of said gas and responsively outputting said third signal, said silicon controlled rectifier responding to said third signal and outputting said first signal to said power circuit; wherein said set of separable contacts and said mechanism for opening said set of separable contacts are part of a ground fault circuit breaker in said power circuit; and wherein said first signal is a predetermined ground current in said power circuit.

22. The apparatus of claim 11 wherein said electrical switching device is a receptacle; and wherein said circuit outputting said first signal communicates said first signal to said receptacle from inside said receptacle.

23. The apparatus of claim 22 wherein said mechanism for opening said set of separable contacts includes an operating mechanism controlling said set of separable contacts and a trip mechanism cooperating with said operating mechanism and responding to said first signal; and wherein said circuit outputting said first signal comprises a switch and a microprocessor receiving said second signal and outputting a third signal to said switch, said microprocessor determining when said second signal exceeds said predetermined level of said gas and responsively outputting said third signal, said switch responding to said third signal and outputting said first signal to said trip mechanism.

24. A method for interrupting a power circuit including a glowing contact and a gas associated with said glowing contact, said method comprising:
   employing a set of separable contacts for interrupting said power circuit;
   opening said set of separable contacts in response to a signal;
   determining when a level of said gas exceeds a predetermined level; and
   outputting said signal responsive to said determining when a level of said gas exceeds a predetermined level.

* * * * *